(12) United States Patent
Izumi et al.

(10) Patent No.: US 12,486,558 B2
(45) Date of Patent: Dec. 2, 2025

(54) STEEL AND METHOD OF PRODUCING SAME

(71) Applicant: JFE STEEL CORPORATION, Tokyo (JP)

(72) Inventors: Daichi Izumi, Tokyo (JP); Koichi Nakashima, Tokyo (JP); Keiji Ueda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 742 days.

(21) Appl. No.: 17/635,377

(22) PCT Filed: Aug. 18, 2020

(86) PCT No.: PCT/JP2020/031164
§ 371 (c)(1),
(2) Date: Feb. 15, 2022

(87) PCT Pub. No.: WO2021/033693
PCT Pub. Date: Feb. 25, 2021

(65) Prior Publication Data
US 2022/0275489 A1    Sep. 1, 2022

(30) Foreign Application Priority Data
Aug. 21, 2019 (JP) ................ 2019-151323

(51) Int. Cl.
*C21D 8/02* (2006.01)
*C22C 38/00* (2006.01)
(Continued)

(52) U.S. Cl.
CPC ........... *C22C 38/04* (2013.01); *C21D 8/0226* (2013.01); *C21D 8/0263* (2013.01);
(Continued)

(58) Field of Classification Search
None
See application file for complete search history.

(56) References Cited

U.S. PATENT DOCUMENTS

| 2021/0164067 A1 | 6/2021 | Nakashima et al. |
| 2021/0301378 A1 | 9/2021 | Izumi et al. |

FOREIGN PATENT DOCUMENTS

| EP | 3617337 A1 * | 3/2020 | ............... C21D 8/02 |
| EP | 3677700 A1 | 7/2020 | |

(Continued)

OTHER PUBLICATIONS

Apr. 21, 2022, the Extended European Search Report issued by the European Patent Office in the corresponding European Patent Application No. 20855004.6.

(Continued)

*Primary Examiner* — Xiaowei Su
(74) *Attorney, Agent, or Firm* — KENJA IP LAW PC

(57) ABSTRACT

The steel of the present disclosure contains, in mass %, C: 0.100% to 0.700%, Si: 0.05% to 1.00%, Mn: 20.0% to 40.0%, P: ≤0.030%, S: ≤0.0050%, Al: 0.01% to 5.00%, Cr: 0.5% to 7.0%, N: 0.0050% to 0.0500%, O: ≤0.0050%, Ti: ≤0.005%, Nb: ≤0.005%, and at least one selected from Ca: 0.0005% to 0.0100%, Mg: 0.0005% to 0.0100%, and REM: 0.0010% to 0.0200%, and has a microstructure with austenite as matrix, where an average grain size is 50 μm or less, a cleanliness of sulfide inclusion is less than 1.0%, a yield strength is 400 MPa or more, and a percent brittle fracture after a Charpy impact test at −269° C. is less than 5%.

2 Claims, 2 Drawing Sheets

(51) Int. Cl.
*C22C 38/02* (2006.01)
*C22C 38/04* (2006.01)
*C22C 38/06* (2006.01)
*C22C 38/26* (2006.01)
*C22C 38/28* (2006.01)

(52) U.S. Cl.
CPC .......... *C22C 38/001* (2013.01); *C22C 38/002* (2013.01); *C22C 38/02* (2013.01); *C22C 38/06* (2013.01); *C22C 38/26* (2013.01); *C22C 38/28* (2013.01); *C21D 2211/001* (2013.01)

(56) References Cited

FOREIGN PATENT DOCUMENTS

| | | | |
|---|---|---|---|
| JP | S58197256 A | | 11/1983 |
| JP | 2008-189984 A | † | 8/2008 |
| JP | 2012-12682 A | † | 1/2012 |
| JP | 2016084529 A | | 5/2016 |
| JP | 2016-196703 A | † | 11/2016 |
| JP | 2018104792 A | | 7/2018 |
| KR | 1020160078825 A | | 7/2016 |
| TW | 201016853 A | | 5/2010 |
| TW | 201839152 A | | 11/2018 |
| WO | WO-2018199145 A1 * | | 11/2018 ............... C21D 8/02 |
| WO | 2019044928 A1 | † | 3/2019 |
| WO | 2019112012 A1 | | 6/2019 |
| WO | 2019156179 A1 | | 8/2019 |
| WO | 2020027211 A1 | | 2/2020 |
| WO | 2020039979 A1 | † | 2/2020 |

OTHER PUBLICATIONS

Nov. 30, 2022, Office Action issued by the China National Intellectual Property Administration in the corresponding Chinese Patent Application No. 202080058304.7 with English language concise statement of relevance.
Feb. 26, 2021, Office Action issued by the Taiwan Intellectual Property Office in the corresponding Taiwanese Patent Application No. 109128382 with English language Search Report.
Oct. 27, 2020, International Search Report issued in the International Patent Application No. PCT/JP2020/031164.
May 6, 2022, Office Action issued by the China National Intellectual Property Administration in the corresponding Chinese Patent Application No. 202080058304.7 with English language search report.
Huo Xiangdong et al., Physical Metallurgy of Steel, 1st edition, Dec. 31, 2017, p. 225.

\* cited by examiner
† cited by third party

STEEL AND METHOD OF PRODUCING SAME

TECHNICAL FIELD

This disclosure relates to a steel which is suitable as structural steel used in extremely low temperature environments, such as tanks for storing liquid hydrogen, liquid helium, liquefied gas and the like, as well as a method of producing the same.

BACKGROUND

When hot rolled steel plates are used in structures of tanks for storing liquid hydrogen, liquid helium and liquefied gas, the steel plates are required to have excellent toughness at cryogenic temperatures in addition to high strength, because their operating environments are at extremely low temperatures. For example, when a hot rolled steel plate is used in a tank for storing liquid helium, it is necessary to ensure excellent toughness at a temperature no higher than −269° C., which is the boiling point of helium. When a steel material has inferior toughness at cryogenic temperatures, it may not be able to maintain the safety as a structure for cryogenic storage. Therefore, there is a strong demand for improving the toughness at cryogenic temperatures of the applied steel material.

In response to this demand, austenitic stainless steel with austenite, which does not exhibit brittleness at cryogenic temperatures, as the structure of the steel plate, has conventionally been used. However, because of the high alloy costs and producing costs, there has been a desire for a steel material that is inexpensive yet has excellent toughness at cryogenic temperatures.

For example, JP 2018-104792 A (PTL 1) proposes using a high-Ni steel containing a large amount of Ni, which is an austenite-stabilizing element, as a structural steel in an environment of −253° C., as a new steel material to replace conventional low-temperature steels. PTL 1 proposes a technology of securing toughness at cryogenic temperatures by, for example, controlling the grain size and morphology of prior austenite.

CITATION LIST

Patent Literature

PTL 1: JP 2018-104792 A

SUMMARY

Technical Problem

The technology described in PTL 1 renders it possible to provide a high-Ni steel with excellent toughness at cryogenic temperatures, but the high-Ni steel needs to contain 12.5% or more of Ni from the viewpoint of ensuring the toughness at cryogenic temperatures, and a reduction in material costs is required. Another problem is high producing costs, because it is necessary to perform heat treatment such as reheating quenching, intermediate heat treatment and tempering to secure austenite phase or the like.

It could thus be helpful to provide a steel having high strength and excellent toughness at cryogenic temperatures, with which costs of materials and producing processes can be reduced. It is also helpful to propose an advantageous method of producing such a steel. As used herein, the "high strength" means having a yield strength of 400 MPa or more at room temperature, and the "excellent toughness at cryogenic temperatures" means having a percent brittle fracture of less than 5.0% after a Charpy impact test at −196° C. and further at −269° C.

Solution to Problem

To solve the above problems, we conducted diligent research on various factors determining the chemical composition and microstructure of a steel plate for steels having a relatively high Mn content of 20.0% or more, and we found the following a. to c.

a. The above-mentioned austenite steel has more sulfide inclusions than a carbon steel because it contains a large amount of Mn. The sulfide inclusions here mainly refer to MnS. Sulfide inclusions serve as initiation points of fracture. Therefore, when the cleanliness of sulfide inclusion after hot rolling and cooling treatment is 1.0% or more, the toughness at cryogenic temperatures is deteriorated. Thus, reducing sulfide inclusions is effective in improving the toughness at cryogenic temperatures of the steel.

b. When hot rolling is performed under appropriate conditions, the cleanliness of sulfide inclusion can be suppressed to less than 1.0%, and the toughness at cryogenic temperatures of the steel can be improved without performing another heat treatment after rolling, which reduces the producing costs.

c. The yield strength of the steel can be increased by performing hot rolling under appropriate conditions to provide a high dislocation density and by suitably controlling the crystal grain size.

The present disclosure is based on the aforementioned findings and further studies. We thus provide the following.

1. A steel, comprising
  a chemical composition containing (consisting of), in mass %,
  C: 0.100% or more and 0.700% or less,
  Si: 0.05% or more and 1.00% or less,
  Mn: 20.0% or more and 40.0% or less,
  P: 0.030% or less,
  S: 0.0050% or less,
  Al: 0.01% or more and 5.00% or less,
  Cr: 0.5% or more and 7.0% or less,
  N: 0.0050% or more and 0.0500% or less,
  O: 0.0050% or less,
  Ti: 0.005% or less, and
  Nb: 0.005% or less, and
  further containing, in mass %, at least one selected from the group consisting of
  Ca: 0.0005% or more and 0.0100% or less,
  Mg: 0.0005% or more and 0.0100% or less, and
  REM: 0.0010% or more and 0.0200% or less,
  with the balance being Fe and inevitable impurities, and
  a microstructure having austenite as matrix, wherein
  the microstructure has an average grain size of 50 μm or less and a cleanliness of sulfide inclusion of less than 1.0%, and
  a yield strength is 400 MPa or more, and a percent brittle fracture after a Charpy impact test at −269° C. is less than 5%.

2. The steel according to 1., wherein the chemical composition further contains, in mass %, at least one selected from the group consisting of
Cu: 1.0% or less,
Ni: 1.0% or less,
Mo: 2.0% or less,
V: 2.0% or less, and
W: 2.0% or less.
3. A method of producing a steel, comprising
heating a steel material having the chemical composition according to 1. or 2. to a temperature range of 1100° C. or higher and 1300° C. or lower,
subjecting the steel material to hot rolling, wherein during the hot rolling at a temperature range of 900° C. or higher, time interval between passes until a next rolling pass is performed is 200 seconds or shorter, and pass rolling reduction (%) in the next rolling pass/the time interval between passes (sec) 0.015 (%/sec),
subjecting the steel material to finishing rolling with a finishing temperature of 700° C. or high and lower than 900° C., and
then subjecting the steel material to a cooling treatment where an average cooling rate from a temperature of (finishing temperature—100° C.) or higher to a temperature range of 300° C. or higher and 650° C. or lower is 1.0° C./s or higher.

As used herein, each temperature described above is the surface temperature of a steel material or a steel plate, respectively.

Advantageous Effect

According to the present disclosure, it is possible to provide a steel having high strength and excellent toughness at cryogenic temperatures. Therefore, the steel of the present disclosure significantly contributes to improving the safety and product life of a steel structure used in cryogenic environments, such as a tank for storing liquid hydrogen, liquid helium, and liquefied gas, which exhibits remarkable industrial effects. In addition, the producing method of the present disclosure does not cause a decrease in productivity or an increase in producing costs, which is a method with excellent economic efficiency.

BRIEF DESCRIPTION OF THE DRAWINGS

In the accompanying drawings.

DETAILED DESCRIPTION

Figure 1:
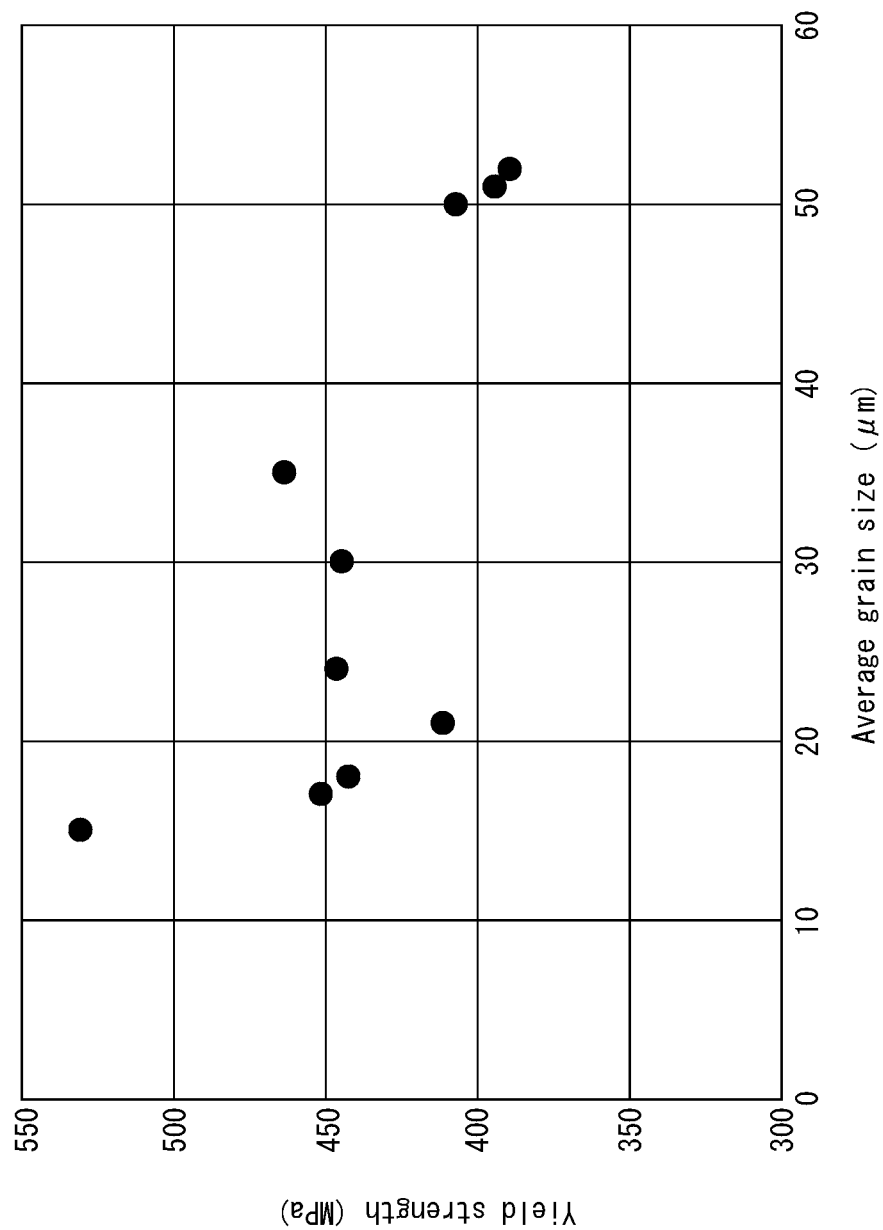
FIG. 1 is a graph illustrating the relationship between the average grain size (mean grain size) and the yield strength of a steel satisfying the chemical composition of the present disclosure.

The following describes the steel of the present disclosure in detail.
[Chemical Composition]
First, the chemical composition of the steel of the present disclosure and reasons for limitation will be described. Note that the unit "%" of each component is "%" unless otherwise specified.

C: 0.100% or More and 0.700% or Less
C is an inexpensive austenite-stabilizing element and is an important element in obtaining austenite. To achieve the effect, the C content needs to be 0.100% or more. On the other hand, when the C content exceeds 0.700%, Cr carbides are excessively formed, and the toughness at cryogenic temperatures is deteriorated. Therefore, the C content is set to 0.100% or more and 0.700% or less. The C content is preferably 0.200% or more. The C content is preferably 0.600% or less. The C content is more preferably 0.200% or more and 0.600% or less.
Si: 0.05% or More and 1.00% or Less
Si is an element that acts as a deoxidizing material. It not only is necessary for steelmaking but also increases the strength of a steel plate by solid solution strengthening. To achieve the effect, the Si content needs to be 0.05% or more. On the other hand, when the content exceeds 1.00%, non-thermal stress (internal stress) increases excessively, resulting in deterioration of toughness at cryogenic temperatures. Therefore, Si content is set to 0.05% or more and 1.00% or less. The Si content is preferably 0.07% or more. The C content is preferably 0.80% or less. The Si content is more preferably 0.07% or more and 0.80% or less.
Mn: 20.0% or More and 40.0% or Less
Mn is a relatively inexpensive austenite-stabilizing element. In the present disclosure, Mn is an important element to achieve both the strength and the toughness at cryogenic temperatures by austenitizing the microstructure. To achieve the effect, the Mn content needs to be 20.0% or more. On the other hand, when the content exceeds 40.0%, the grain boundary strength decreases, and the toughness at cryogenic temperatures deteriorates. Therefore, the Mn content is set to 20.0% or more and 40.0% or less. The Mn content is preferably 23.0% or more. The Mn content is preferably 38.0% or less. The Si content is more preferably 23.0% or more and 38.0% or less. The Mn content is still more preferably 36.0% or less.
P: 0.030% or Less
When the P content exceeds 0.030%, the toughness at cryogenic temperatures is deteriorated due to excessive segregation at grain boundaries. Therefore, the upper limit is set to 0.030%, and the P content is desirably as low as possible. Therefore, the P content is set to 0.030% or less. Note that the P content is desirably 0.002% or more, because excessive reduction of P content increases refining costs and is economically disadvantageous. The P content is preferably 0.005% or more. The P content is preferably 0.028% or less. The P content is more preferably 0.005% or more and 0.028% or less. The P content is still more preferably 0.024% or less.
S: 0.0050% or Less
S is an element that deteriorates the toughness at cryogenic temperatures and the ductility of a steel plate. Therefore, the upper limit is set to 0.0050%, and the S content is desirably as low as possible. Therefore, the S content is set to 0.0050% or less. The S content is preferably 0.0045% or less. Note that the S content is desirably 0.0010% or more, because excessive reduction of S content increases refining costs and is economically disadvantageous.
Al: 0.01% or More and 5.00% or Less
Al is an element that acts as a deoxidizer and is used most in molten steel deoxidizing processes to obtain a steel plate. Further, Al contributes to the improvement of yield strength and local elongation in a tensile test. To achieve the effect, the Al content needs to be 0.01% or more. On the other hand, when the Al content exceeds 5.00%, a large amount of inclusion is formed, and the toughness at cryogenic temperatures is deteriorated. Therefore, the Al content is set to 5.00% or less. Therefore, the Al content is set to 0.01% or more and 5.00% or less. The Al content is preferably 0.02% or more. The Al content is preferably 4.00% or less. The Al content is more preferably 0.02% or more and 4.00% or less.

Cr: 0.5% or More and 7.0% or Less

Cr is an element that effectively improves the toughness at cryogenic temperatures because it improves the grain boundary strength. Cr is also an element that effectively improves the strength. To achieve the effect, the Cr content needs to be 0.5% or more. On the other hand, when the Cr content exceeds 7.0%, Cr carbides are formed, and the toughness at cryogenic temperatures is deteriorated. Therefore, the Cr content is set to 0.5% or more and 7.0% or less. The Cr content is preferably 1.0% or more and more preferably 1.2% or more. The Cr content is preferably 6.7% or less and more preferably 6.5% or less. The Cr content is more preferably 1.0% or more and 6.7% or less. The Cr content is still more preferably 1.2% or more and 6.5% or less.

N: 0.0050% or More and 0.0500% or Less

N is an austenite-stabilizing element and is an element effective in improving the toughness at cryogenic temperatures. To achieve the effect, the N content needs to be 0.0050% or more. On the other hand, when the content exceeds 0.0500%, nitrides or carbonitrides are coarsened, and the toughness is deteriorated. Therefore, the N content is set to 0.0050% or more and 0.0500% or less. The N content is preferably 0.0060% or more. The N content is preferably 0.0400% or less. The N content is more preferably 0.0060% or more and 0.0400% or less.

O: 0.0050% or Less

O deteriorates the toughness at cryogenic temperatures due to formation of oxides. Therefore, the O content is set to 0.0050% or less. The O content is preferably 0.0045% or less. Note that the O content is desirably 0.0010% or more, because excessive reduction of O content increases refining costs and is economically disadvantageous.

Ti and Nb Contents: Suppressed to 0.005% or Less Each

Excessive inclusion of Ti and Nb deteriorates the toughness at cryogenic temperatures because they form carbonitride with a high melting point in the steel. Ti and Nb are inevitably mixed in from raw materials or the like. In most cases, they are mixed in ranges of Ti: more than 0.005% and 0.010% or less, and Nb: more than 0.005% and 0.010% or less. Therefore, it is necessary to intentionally limit the amount of Ti and Nb mixed with the method described below, and to suppress the contents of Ti and Nb to 0.005% or less, respectively. By suppressing the contents of Ti and Nb to 0.005% or less, respectively, the above-mentioned adverse effects of carbonitrides can be eliminated, and excellent toughness at cryogenic temperatures and ductility can be secured. The contents of Ti and Nb are preferably 0.003% or less, respectively. The contents of Ti and Nb may be 0%, respectively. However, the contents of Ti and Nb are desirably 0.001% or more, respectively, because excessive reduction is not preferable from the viewpoint of steelmaking costs.

At least one selected from the group consisting of Ca: 0.0005% or more and 0.0100% or less, Mg: 0.0005% or more and 0.0100% or less, REM: 0.0010% or more and 0.0200% or less Ca, Mg and REM are useful elements for controlling the morphology of inclusions. Controlling the morphology of inclusions means controlling expanded sulfide inclusions to granular inclusions. The ductility and the toughness can be improved through the morphological control of inclusions. To achieve the effect, the Ca and Mg contents are preferably 0.0005% or more, and the REM content is preferably 0.0010% or more. On the other hand, when any of these elements is contained in a large amount, the amount of nonmetallic inclusion increases, and therefore the ductility and the toughness may be deteriorated. Further, it may be economically disadvantageous.

Therefore, when Ca and Mg are contained, the content of each is preferably 0.0005% or more and 0.0100% or less, and when REM is contained, the content is preferably 0.0010% or more and 0.0200% or less. The Ca content is more preferably 0.0010% or more. The Ca content is more preferably 0.0080% or less. The Ca content is still more preferably 0.0010% or more and 0.0080% or less. The Mg content is more preferably 0.0010% or more. The Mg content is more preferably 0.0080% or less. The Mg content is still more preferably 0.0010% or more and 0.0080% or less. The REM content is more preferably 0.0020% or more. The REM content is more preferably 0.0150% or less. The REM content is still more preferably 0.0020% or more and 0.0150% or less.

The term "REM" refers to rare earth metals and is a generic term of 17 elements including 15 elements of lanthanoids and Y and Sc. At least one of these elements can be contained. The content of REM means the total content of these elements.

To further improve the strength and the toughness at cryogenic temperatures, the following elements can be contained as necessary in addition to the above essential elements in the present disclosure.

At least one selected from the group consisting of Cu: 1.0% or less, Ni: 1.0% or less, Mo: 2.0% or less, V: 2.0% or less, and W: 2.0% or less Cu, Ni: 1.0% or Less Each Cu and Ni are elements that not only increase the strength of the steel plate by solid solution strengthening, but also improve the mobility of dislocations and the toughness at low temperatures. To achieve the effect, the Cu and Ni contents are preferably 0.01% or more and are more preferably 0.03% or more. On the other hand, when the content exceeds 1.0%, the surface characteristics are deteriorated during rolling, and the production costs are increased. Therefore, when these alloying elements are contained, the content of each is preferably 1.00% or less and more preferably 0.70% or less. The Cu content and the Ni content are preferably 0.03% or more. The Cu content and the Ni content are preferably 0.70% or less, and they are more preferably 0.50% or less.

Mo, V, W: 2.0% or Less Each

Mo, V and W contribute to stabilization of austenite and contribute to improvement of the strength of the steel material. To achieve the effect, the Mo, V and W contents are preferably 0.001% or more and more preferably 0.003% or more. On the other hand, when the content exceeds 2.0%, coarse carbonitrides are formed and serve as initiation points of fracture. Further, the production costs increase. Therefore, when these alloying elements are contained, the content is preferably 2.0% or less and more preferably 1.7% or less. The content of each of Mo, V and W is more preferably 0.003% or more. The content of each of Mo, V and W is more preferably 1.7% or less. The content of each of Mo, V and W is still more preferably 1.5% or less.

The balance other than the above-mentioned components is iron and inevitable impurities. The inevitable impurities here include H, B and the like, and a total of 0.01% or less is acceptable.

[Microstructure]
Microstructure Having Austenite as Matrix

When the crystal structure of a steel material is a body-centered cubic (bcc) structure, the steel material is not suitable for use in cryogenic environments because it may cause brittle fractures in cryogenic environments. Therefore, in consideration of the use in cryogenic environments, the matrix of the steel material is preferably an austenite microstructure where the crystal structure is a face-centered cubic (fcc) structure. As used herein, "austenite as matrix" means that the austenite phase has an area ratio of 90% or more, where the austenite phase preferably has an area ratio of 95% or more. The balance other than the austenite phase is a ferrite phase or martensite phase.

Average Grain Size in Microstructure: 50 μm or Less

As a result of verifying the relationship between the average grain size and the yield stress in a tensile test, it is found that the yield stress can achieve 400 MPa or more when the average grain size is 50 μm or less in a steel having the chemical composition of the present disclosure, as illustrated in FIG. 1.

The crystal grain in the present specification mainly refers to austenite grains, and the average grain size can be determined by randomly selecting 100 crystal grains from an image taken at 200 times magnification using an optical microscopy, calculating the equivalent circular diameter, and using the average value as the average grain size.

Cleanliness of Sulfide Inclusion in Microstructure: Less than 1.0%

Figure 2:
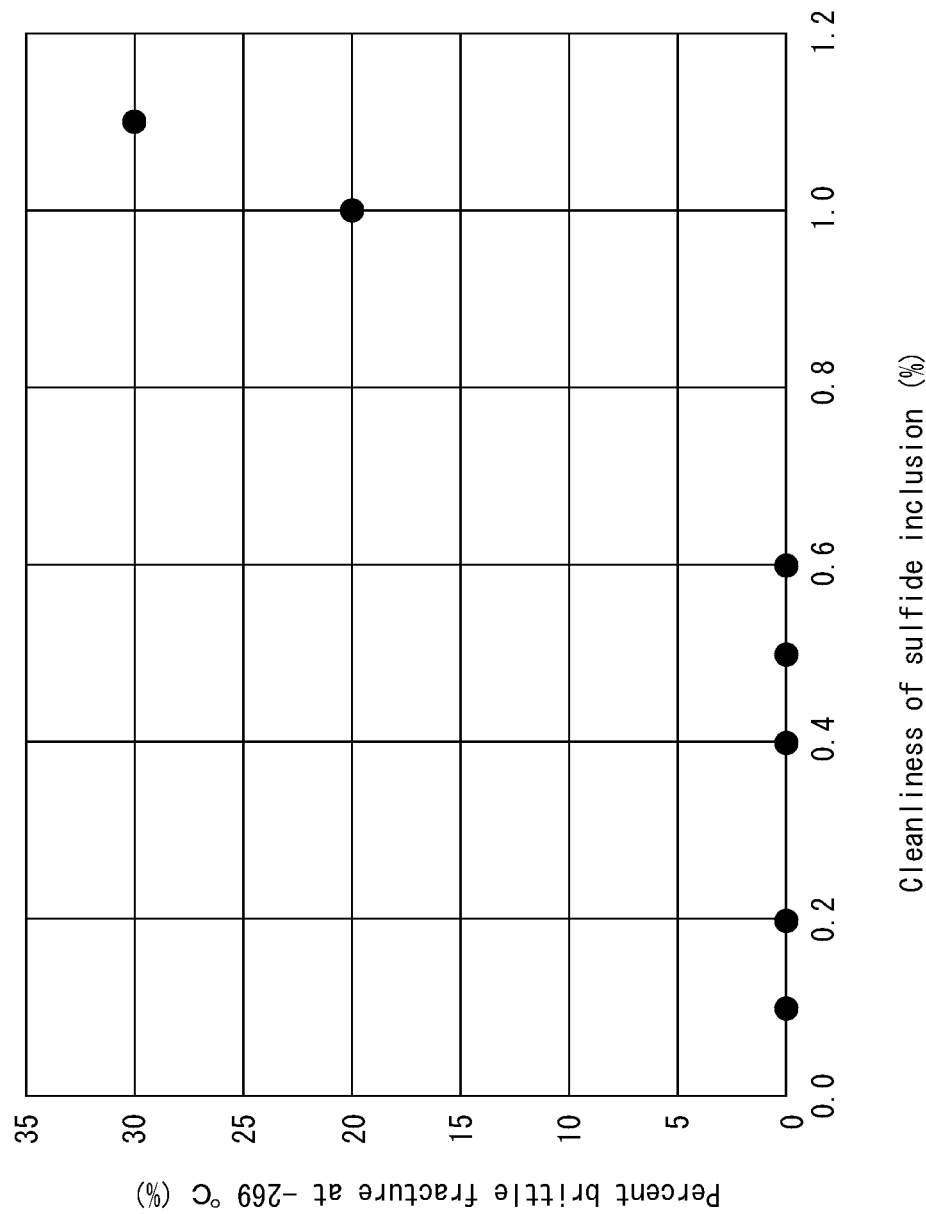
FIG. 2 is a graph illustrating the relationship between the cleanliness of sulfide inclusion and the percent brittle fracture at −269° C. of a steel that satisfies the producing conditions of the present disclosure.

As a result of verifying the relationship between the cleanliness of sulfide inclusion and the percent brittle fracture in a Charpy impact test, it is found that the percent brittle fracture can be reduced to less than 5% when the cleanliness of sulfide inclusion is less than 1.0% in a steel that meets the producing conditions of the present disclosure, as illustrated in FIG. 2.

The cleanliness in the present specification can be determined according to the examples described below.

The above-described average grain size: 50 μm or less and the cleanliness of sulfide inclusion: less than 1.0% can be achieved by performing hot rolling under the conditions described below with the above-described chemical composition.

The steel of the present disclosure can be obtained by steelmaking, where a molten steel having the above-described chemical composition is obtained with a known smelting method such as a converter, an electric furnace, or the like. In addition, secondary refinement may be performed in a vacuum degassing furnace. At that time, to limit Ti and Nb, which hinder the control of a preferable microstructure, to the above-described ranges, it is preferable to avoid inevitable mixing from raw materials and the like and take measures to reduce the contents thereof. For example, by lowering the basicity of slag in the refining stage, these alloys are concentrated and discharged into the slag, thereby reducing the concentration of Ti and Nb in a final slab product. Alternatively, a method of blowing oxygen to oxidize the Ti and Nb and floating and separating the alloy of Ti and Nb in reflux may also be used. Subsequently, it is preferable to obtain a steel material such as a slab having a predetermined size with a known casting method such as a continuous casting method or an ingot casting and blooming method.

The following specifies the producing conditions for making the above steel material into a steel material having excellent toughness at cryogenic temperatures.

To obtain a steel having the above properties, it is important to heat the steel slab (steel material) to a temperature range of 1100° C. or higher and 1300° C. or lower, then to perform a next rolling pass within 200 seconds during hot rolling at a temperature range of 900° C. or higher so that pass rolling reduction (%)/time interval between passes (sec) 0.015%/sec, and to perform hot rolling at a finishing temperature of 700° C. or higher and lower than 900° C. as finishing rolling. The temperature used herein refers to the surface temperature of the steel material.

[Heating Temperature of Steel Material: 1100° C. or Higher and 1300° C. or Lower]

To exert the above-mentioned effect of Mn, it is important to diffuse Mn in the steel. That is, the heating temperature of the steel material before hot rolling is set to 1100° C. or higher so that Mn is diffused during hot rolling. On the other hand, when the temperature exceeds 1300° C., the steel may start to melt. Therefore, the upper limit of the heating temperature is set to 1300° C. The heating temperature of the steel material is preferably 1130° C. or higher. The heating temperature of the steel material is preferably 1270° C. or lower. The heating temperature of the steel material is more preferably 1130° C. or higher and 1270° C. or lower.

[Hot Rolling at 900° C. Or Higher: Time Interval Between Passes is 200 Seconds or Shorter, and Pass Rolling Reduction (%)/Time Interval Between Passes (Sec)≥0.015 (%/Sec)]

After the steel material is heated with the method described above, it is subjected to hot rolling. It is particularly important to perform a next rolling pass within 200 seconds, which is the time interval between passes, during rolling in a temperature range of 900° C. or higher. This is because, during rolling in a temperature range of 900° C. or higher, grains start to grow, and crystal grains are coarsened, if the steel material is kept in that temperature range for a long time. The interval between rolling passes (time interval between passes) is preferably within 150 seconds and more preferably within 100 seconds. Although there is no lower limit for the time interval between passes, it is preferable to leave an interval of at least 5 seconds as time interval between passes in consideration of proceedings in actual process. Although the upper limit of the hot rolling temperature is not specified, it is preferably 1250° C. or lower. In a case where there are multiple time intervals between passes in the temperature range of 900° C. or higher (i.e., rolling is performed for at least three times in the temperature range of 900° C. or higher), the longest time (maximum value) of the multiple time intervals between passes is set to 200 seconds or shorter.

Further, during rolling in the temperature range of 900° C. or higher, a condition of pass rolling reduction (%)/time interval between passes (sec) 0.015 (%/sec) needs to be satisfied for each rolling including and after the second one. In this way, austenite is recrystallized finely, grain growth after recrystallization can be suppressed, and the formation of coarse grains can be suppressed reliably. In a case where there are multiple pass rolling reduction/time interval between passes in the temperature range of 900° C. or higher, the minimum value of the pass rolling reduction/time interval between passes is set to 0.015 (%/sec) or more. The pass rolling reduction/time interval between passes is preferably 0.020 (%/sec) or more.

[Finishing Temperature: 700° C. Or Higher and Lower than 900° C.]

It is necessary to perform final finishing rolling including one or more passes at a finishing temperature of 700° C. or higher and lower than 900° C. That is, crystal grains can be refined by performing rolling for one or more passes at a temperature of lower than 900° C. Further, when the finishing temperature is in a range of 900° C. or higher, the crystal grains are excessively coarsened, and a desired yield strength cannot be obtained. Therefore, it is preferable to perform final finishing rolling including one or more passes at a temperature lower than 900° C. The finishing temperature is preferably 890° C. or lower and more preferably 880° C. or lower. On the other hand, when the finishing temperature is lower than 700° C., the toughness at cryogenic temperatures deteriorates. Therefore, the finishing temperature is set to 700° C. or higher. The finishing temperature is preferably 750° C. or higher. The rolling reduction of finishing rolling is preferably 10% or more per pass.

The thickness of the plate at the end of finishing rolling is not specified, but it is preferably 6 mm to 30 mm considering the application as a structure for cryogenic storage.

[Average cooling rate from a temperature of (finishing temperature— 100° C.) or higher to a temperature range of 300° C. or higher and 650° C. or lower: 1.0° C./s or higher]

After hot rolling, the steel plate is subjected to cooling treatment a high cooling rate. When the cooling rate of the steel plate after hot rolling is slow, formation of carbides is accelerated, resulting in deterioration of toughness at cryogenic temperatures. The formation of carbides can be suppressed by cooling the steel plate at an average cooling rate of 1.0° C./s or higher from a temperature of (finishing temperature—100° C.) or higher to a temperature range of 300° C. or higher and 650° C. or lower. The reason why the temperature range for cooling is set to this temperature range is that in this way, precipitation of carbides can be suppressed. In particular, the reason why the cooling start temperature is set to (finishing temperature—100° C.) or higher is that precipitation of carbides is accelerated when the cooling start temperature is lower than a temperature of (finishing temperature—100° C.) after finishing rolling. Further, excessive cooling distorts the steel plate and lowers the productivity. Therefore, it is preferable to set the upper limit of the cooling start temperature to 900° C. The upper limit of the average cooling rate is not specified, but it is preferably 200° C./s or lower. Air cooling is preferred, especially for steel materials with a thickness of less than 10 mm.

EXAMPLES

The following provides a more detailed explanation of the present disclosure through examples. However, the present disclosure is not limited to the following examples.

Steel slabs (steel materials) having the chemical composition listed in Table 1 were prepared by a process for refining with converter and ladle and continuous casting. Next, the steel slabs thus obtained were subjected to hot rolling under the conditions listed in Table 2 to obtain steel plates having a thickness of 6 mm to 30 mm. The steel plates thus obtained were subjected to microstructure evaluation and evaluation of mechanical properties such as tensile properties and toughness at cryogenic temperatures as described below.

In Table 2, the "time interval between passes during hot rolling at 900° C. or higher" indicates the longest time (maximum value) if there were multiple time intervals between passes, and the "pass rolling reduction/time interval between passes" indicates the minimum value if there were multiple pass rolling reduction/time interval between passes. Further, the "finishing temperature during finishing rolling" indicates the rolling finish temperature.

TABLE 1

| Steel sample No. | Chemical composition (mass %) | | | | | | | | | |
|---|---|---|---|---|---|---|---|---|---|---|
| | C | Si | Mn | P | S | Al | Cr | N | O | Ti |
| 1 | 0.512 | 0.18 | 35.0 | 0.016 | 0.0035 | 0.04 | 4.4 | 0.0105 | 0.0020 | 0.003 |
| 2 | 0.359 | 0.30 | 31.2 | 0.020 | 0.0028 | 0.06 | 0.6 | 0.0153 | 0.0018 | 0.002 |
| 3 | 0.441 | 0.45 | 28.6 | 0.023 | 0.0032 | 0.05 | 3.9 | 0.0180 | 0.0016 | 0.004 |
| 4 | 0.296 | 0.15 | 36.3 | 0.015 | 0.0020 | 0.50 | 3.5 | 0.0237 | 0.0017 | 0.002 |
| 5 | 0.155 | 0.08 | 30.6 | 0.025 | 0.0045 | 4.52 | 5.5 | 0.0465 | 0.0045 | 0.001 |
| 6 | 0.305 | 0.33 | 23.1 | 0.017 | 0.0022 | 2.51 | 2.1 | 0.0061 | 0.0021 | 0.002 |
| 7 | 0.408 | 0.12 | 20.4 | 0.013 | 0.0015 | 0.05 | 6.5 | 0.0144 | 0.0015 | 0.001 |
| 8 | 0.650 | 0.95 | 39.6 | 0.011 | 0.0018 | 1.01 | 4.6 | 0.0182 | 0.0016 | 0.002 |
| 9 | 0.090 | 0.32 | 22.5 | 0.022 | 0.0030 | 0.07 | 2.3 | 0.0103 | 0.0020 | 0.002 |
| 10 | 0.742 | 0.16 | 25.8 | 0.025 | 0.0024 | 0.05 | 2.7 | 0.0090 | 0.0022 | 0.003 |
| 11 | 0.186 | 0.03 | 29.2 | 0.025 | 0.0036 | 0.30 | 2.8 | 0.0134 | 0.0026 | 0.003 |
| 12 | 0.640 | 1.03 | 20.8 | 0.028 | 0.0043 | 0.08 | 0.7 | 0.0374 | 0.0041 | 0.002 |
| 13 | 0.573 | 0.71 | 19.1 | 0.022 | 0.0035 | 0.16 | 1.4 | 0.0258 | 0.0037 | 0.001 |
| 14 | 0.124 | 0.35 | 40.8 | 0.018 | 0.0026 | 0.05 | 0.7 | 0.0488 | 0.0018 | 0.002 |
| 15 | 0.217 | 0.47 | 39.0 | 0.033 | 0.0029 | 0.06 | 1.0 | 0.0169 | 0.0032 | 0.002 |
| 16 | 0.669 | 0.88 | 20.5 | 0.027 | 0.0055 | 1.60 | 1.2 | 0.0328 | 0.0040 | 0.002 |
| 17 | 0.591 | 0.36 | 25.6 | 0.018 | 0.0025 | 5.03 | 6.2 | 0.0183 | 0.0023 | 0.001 |
| 18 | 0.184 | 0.23 | 39.3 | 0.019 | 0.0031 | 0.04 | 0.4 | 0.0137 | 0.0024 | 0.002 |
| 19 | 0.575 | 0.64 | 25.0 | 0.022 | 0.0026 | 1.37 | 7.2 | 0.0381 | 0.0022 | 0.003 |
| 20 | 0.134 | 0.86 | 21.1 | 0.026 | 0.0027 | 0.05 | 1.0 | 0.0045 | 0.0019 | 0.002 |
| 21 | 0.158 | 0.76 | 22.4 | 0.019 | 0.0043 | 0.32 | 0.7 | 0.0504 | 0.0043 | 0.001 |
| 22 | 0.637 | 0.89 | 21.3 | 0.020 | 0.0038 | 3.47 | 6.2 | 0.0201 | 0.0055 | 0.002 |
| 23 | 0.353 | 0.50 | 38.8 | 0.017 | 0.0036 | 2.53 | 0.6 | 0.0142 | 0.0024 | 0.006 |
| 24 | 0.596 | 0.43 | 24.6 | 0.018 | 0.0023 | 0.25 | 3.5 | 0.0422 | 0.0018 | 0.002 |
| 25 | 0.450 | 0.37 | 37.8 | 0.023 | 0.0042 | 0.08 | 2.0 | 0.0290 | 0.0031 | 0.002 |
| 26 | 0.216 | 0.62 | 36.6 | 0.025 | 0.0039 | 0.51 | 0.9 | 0.0183 | 0.0025 | 0.003 |
| 27 | 0.649 | 0.57 | 36.8 | 0.019 | 0.0037 | 0.05 | 6.5 | 0.0251 | 0.0020 | 0.002 |
| 28 | 0.205 | 0.32 | 21.0 | 0.020 | 0.0034 | 2.31 | 2.1 | 0.0323 | 0.0041 | 0.003 |

TABLE 1-continued

| | | | | | | | | | |
|---|---|---|---|---|---|---|---|---|---|
| 29 | 0.672 | 0.84 | 23.2 | 0.024 | 0.0028 | 1.05 | 6.8 | 0.0442 | 0.0045 | 0.002 |
| 30 | 0.410 | 0.25 | 39.7 | 0.019 | 0.0045 | 3.05 | 0.6 | 0.0276 | 0.0043 | 0.002 |
| 31 | 0.121 | 0.10 | 25.4 | 0.018 | 0.0023 | 0.009 | 0.7 | 0.0060 | 0.0025 | 0.001 |

| Steel sample No. | Chemical composition (mass %) | | | | | | | | Remarks |
|---|---|---|---|---|---|---|---|---|---|
| | Nb | Ca | Mg | REM | Cu | Ni | Mo | V | W | |
| 1 | 0.001 | 0.0006 | — | — | — | — | — | — | — | Example |
| 2 | 0.002 | — | 0.0005 | — | — | — | — | — | — | Example |
| 3 | 0.001 | — | — | 0.0010 | — | — | — | — | — | Example |
| 4 | 0.001 | 0.0095 | — | — | 0.8 | — | — | — | — | Example |
| 5 | 0.002 | — | 0.0090 | — | — | 0.9 | — | — | — | Example |
| 6 | 0.004 | — | — | 0.0150 | — | — | 1.8 | — | — | Example |
| 7 | 0.001 | 0.0030 | — | — | — | — | — | 0.1 | — | Example |
| 8 | 0.001 | — | 0.0006 | — | — | — | — | — | 0.1 | Example |
| 9 | 0.002 | 0.0012 | — | — | — | — | — | — | — | Comparative Example |
| 10 | 0.001 | — | 0.0005 | — | — | — | — | — | — | Comparative Example |
| 11 | 0.002 | — | — | 0.0011 | — | — | — | — | — | Comparative Example |
| 12 | 0.003 | 0.0008 | — | — | — | — | — | — | — | Comparative Example |
| 13 | 0.001 | — | 0.0005 | — | — | — | — | — | — | Comparative Example |
| 14 | 0.003 | — | — | 0.0010 | — | — | — | — | — | Comparative Example |
| 15 | 0.002 | 0.0010 | — | — | — | — | — | — | — | Comparative Example |
| 16 | 0.001 | — | 0.0008 | — | — | — | — | — | — | Comparative Example |
| 17 | 0.002 | — | — | 0.0012 | — | — | — | — | — | Comparative Example |
| 18 | 0.002 | 0.0023 | — | — | — | — | — | — | — | Comparative Example |
| 19 | 0.002 | — | 0.0010 | — | — | — | — | — | — | Comparative Example |
| 20 | 0.001 | — | — | 0.0015 | — | — | — | — | — | Comparative Example |
| 21 | 0.001 | 0.0032 | — | — | — | — | — | — | — | Comparative Example |
| 22 | 0.002 | — | 0.0036 | — | — | — | — | — | — | Comparative Example |
| 23 | 0.002 | — | — | 0.0020 | — | — | — | — | — | Comparative Example |
| 24 | 0.006 | 0.0040 | — | — | — | — | — | — | — | Comparative Example |
| 25 | 0.002 | 0.0004 | — | — | — | — | — | — | — | Comparative Example |
| 26 | 0.001 | — | 0.0004 | — | — | — | — | — | — | Comparative Example |
| 27 | 0.002 | — | — | 0.0009 | — | — | — | — | — | Comparative Example |
| 28 | 0.002 | 0.0101 | — | — | — | — | — | — | — | Comparative Example |
| 29 | 0.003 | — | 0.0103 | — | — | — | — | — | — | Comparative Example |
| 30 | 0.002 | — | — | 0.0202 | — | — | — | — | — | Comparative Example |
| 31 | 0.001 | 0.0018 | — | — | — | — | — | — | — | Comparative Example |

* Underline indicates outside the scope of the present disclosure.

TABLE 2

| Sample No. | Steel sample No. | Plate thickness (mm) | Slab heating temperature (° C.) | Time interval between passes during hot rolling at 900° C. or higher (s) | Pass rolling reduction/ time interval between passes (%/s) | Finishing temperature during finishing rolling (° C.) | Cooling start temperature (° C.) | Cooling rate to 300° C. or higher and 650° C. or lower (° C./s) | Remarks |
|---|---|---|---|---|---|---|---|---|---|
| 1 | 1 | 12 | 1150 | 90 | 0.047 | 880 | 835 | 13.0 | Example |
| 2 | 2 | 15 | 1180 | 80 | 0.053 | 866 | 828 | 12.0 | Example |
| 3 | 3 | 18 | 1210 | 120 | 0.040 | 804 | 744 | 10.0 | Example |

TABLE 2-continued

| Sample No. | Steel sample No. | Plate thickness (mm) | Slab heating temperature (° C.) | Time interval between passes during hot rolling at 900° C. or higher (s) | Pass rolling reduction/ time interval between passes (%/s) | Finishing temperature during finishing rolling (° C.) | Cooling start temperature (° C.) | Cooling rate to 300° C. or higher and 650° C. or lower (° C./s) | Remarks |
|---|---|---|---|---|---|---|---|---|---|
| 4 | 4 | 21 | 1240 | 73 | 0.061 | 783 | 731 | 9.0 | Example |
| 5 | 5 | 24 | 1270 | 155 | 0.029 | 826 | 795 | 8.0 | Example |
| 6 | 6 | 27 | 1130 | 109 | 0.032 | 751 | 723 | 5.0 | Example |
| 7 | 7 | 30 | 1100 | 200 | 0.015 | 864 | 835 | 3.0 | Example |
| 8 | 8 | 9 | 1250 | 60 | 0.080 | 708 | 708 | 1.0 | Example |
| 9 | <u>9</u> | 11 | 1180 | 180 | 0.035 | 843 | 788 | 10.0 | Comparative Example |
| 10 | <u>10</u> | 10 | 1250 | 78 | 0.063 | 759 | 683 | 12.0 | Comparative Example |
| 11 | <u>11</u> | 28 | 1120 | 155 | 0.042 | 865 | 840 | 7.0 | Comparative Example |
| 12 | <u>12</u> | 8 | 1270 | 88 | 0.055 | 732 | 732 | 1.0 | Comparative Example |
| 13 | <u>13</u> | 20 | 1200 | 112 | 0.046 | 840 | 804 | 13.0 | Comparative Example |
| 14 | <u>14</u> | 25 | 1220 | 124 | 0.049 | 821 | 778 | 12.0 | Comparative Example |
| 15 | <u>15</u> | 15 | 1150 | 82 | 0.057 | 742 | 676 | 6.0 | Comparative Example |
| 16 | <u>16</u> | 12 | 1200 | 93 | 0.045 | 720 | 670 | 10.0 | Comparative Example |
| 17 | <u>17</u> | 13 | 1150 | 100 | 0.040 | 783 | 745 | 11.0 | Comparative Example |
| 18 | <u>18</u> | 15 | 1130 | 118 | 0.046 | 852 | 815 | 12.0 | Comparative Example |
| 19 | <u>19</u> | 24 | 1180 | 125 | 0.051 | 833 | 762 | 4.0 | Comparative Example |
| 20 | <u>20</u> | 8 | 1230 | 160 | 0.039 | 736 | 736 | 1.0 | Comparative Example |
| 21 | <u>21</u> | 20 | 1180 | 76 | 0.060 | 759 | 725 | 8.0 | Comparative Example |
| 22 | <u>22</u> | 13 | 1170 | 62 | 0.074 | 721 | 672 | 10.0 | Comparative Example |
| 23 | <u>23</u> | 11 | 1190 | 163 | 0.028 | 738 | 677 | 11.0 | Comparative Example |
| 24 | <u>24</u> | 9 | 1200 | 175 | 0.036 | 755 | 755 | 1.0 | Comparative Example |
| 25 | <u>25</u> | 12 | 1160 | 89 | 0.054 | 802 | 748 | 13.0 | Comparative Example |
| 26 | <u>26</u> | 10 | 1210 | 73 | 0.063 | 781 | 717 | 14.0 | Comparative Example |
| 27 | <u>27</u> | 8 | 1250 | 64 | 0.066 | 827 | 827 | 1.5 | Comparative Example |
| 28 | 1 | 25 | <u>1090</u> | 65 | 0.059 | 710 | 673 | 7.0 | Comparative Example |
| 29 | 2 | 22 | 1250 | <u>210</u> | 0.016 | 873 | 835 | 9.0 | Comparative Example |
| 30 | 3 | 25 | 1200 | 171 | 0.029 | <u>695</u> | 652 | 8.0 | Comparative Example |
| 31 | 4 | 28 | 1150 | 147 | 0.040 | <u>910</u> | 875 | 5.0 | Comparative Example |
| 32 | 5 | 18 | 1150 | 90 | 0.052 | 852 | <u>747</u> | 10.0 | Comparative Example |
| 33 | 6 | 30 | 1200 | 118 | 0.042 | 840 | 803 | <u>0.5</u> | Comparative Example |
| 34 | <u>28</u> | 11 | 1140 | 72 | 0.059 | 726 | 685 | 8.0 | Comparative Example |
| 35 | <u>29</u> | 13 | 1120 | 98 | 0.067 | 745 | 707 | 10.0 | Comparative Example |
| 36 | <u>30</u> | 15 | 1100 | 81 | 0.053 | 732 | 698 | 9.0 | Comparative Example |
| 37 | <u>31</u> | 17 | 1250 | 175 | 0.038 | 870 | 837 | 12.0 | Comparative Example |
| 38 | 5 | 30 | 1250 | 190 | <u>0.014</u> | 853 | 820 | 10.0 | Comparative Example |

* Underline indicates outside the scope of the present disclosure.

(1) Microstructure Evaluation

Area Ratio of Austenite Phase

The area ratio of each phase of the microstructure was obtained from a phase map of electron backscatter diffraction (EBSD) analysis. A test piece for EBSD analysis was collected from a cross section parallel to the rolling direction at a ½ thickness position of each steel plate thus obtained, EBSD analysis was conducted in a field of view of 500

μm×200 μm with a measurement step of 0.3 μm, and a value indicated on the phase map was taken as the area ratio.

The area ratio of austenite phase was 90% or more in all Examples and Comparative Examples, confirming that the matrix was austenite.

Average Grain Size

For each steel plate that had undergone cooling treatment after finishing rolling, a cross section in the rolling direction was polished, 100 crystal grains were randomly selected from an image taken at a ½ thickness position using an optical microscopy at a magnification of 200 times, and the average grain size was determined by the equivalent circular diameter.

Cleanliness of Sulfide Inclusion

In accordance with the provisions of JIS G 0555 (2003), a ½ thickness position of a polished cross section in the rolling direction of each steel plate that had undergone cooling treatment after finishing rolling was observed under a microscope at a magnification of 400 times over 60 fields of view randomly selected, and the cleanliness d (%) was calculated using the following formula with the inclusions of Group A as sulfide inclusions.

$$d=(n/p \times f) \times 100$$

where p is the total number of grid points in a field of view, f is the number of fields of view, and n is the number of grid point centers occupied by inclusions in f fields of view.

(2) Evaluation of Tensile Property

For each steel plate thus obtained, a JIS No. 4 tensile test piece was collected from a steel plate with a thickness of more than 15 mm, and a round bar tensile test piece with a parallel portion diameter of 6 mm and a gauge length of 25 mm was collected from a steel plate with a thickness of 15 mm or less, and a tensile test was conducted to investigate the tensile properties (yield strength, tensile strength, and total elongation). In the present disclosure, a yield strength of 400 MPa or more is judged to have excellent tensile properties.

(3) Evaluation of Toughness at Cryogenic Temperatures

A Charpy V-notched test piece was collected from a direction parallel to the rolling direction at a ½ thickness position of each steel plate having a thickness of more than 10 mm in accordance with the provisions of JIS Z 2242 (2005), and three Charpy impact tests were conducted for each steel plate at −196° C. and −269° C. A subsize Charpy V-notched test piece of 5 mm was collected from a direction parallel to the rolling direction at a ½ thickness position of each steel plate having a thickness of less than 10 mm in accordance with the provisions of JIS Z 2242 (2005), and three Charpy impact tests were conducted for each steel plate at −196° C. and −269° C. The percent brittle fracture was determined visually. Those having a percent brittle fracture of less than 5% were considered to have excellent toughness at cryogenic temperatures. The Charpy impact test at −269° C. was conducted by placing the test piece in a capsule with liquid helium flowing through it.

Reference 1: T. Ogata, K. Hiraga, K. Nagai, and K. Ishikawa: Tetsu-to-Hagane, 69(1983), 641.

The results obtained by the above (1) to (3) evaluations are listed in Table 3.

TABLE 3

| | | Microstructure | | | Mechanical properties | | | | | |
|---|---|---|---|---|---|---|---|---|---|---|
| Sample No. | Steel sample No. | Area ratio of austenite phase (%) | Average grain size (μm) | Cleanliness of sulfide inclusion (%) | Yield strength (MPa) | Tensile strength (MPa) | Total elongation (%) | Percent brittle fracture at −196° C. (%) | Percent brittle fracture at −269° C. (%) | Remarks |
| 1 | 1 | 100 | 35 | 0.5 | 464 | 905 | 57 | 0 | 0 | Example |
| 2 | 2 | 100 | 30 | 0.4 | 445 | 910 | 55 | 0 | 0 | Example |
| 3 | 3 | 100 | 24 | 0.4 | 447 | 930 | 58 | 0 | 0 | Example |
| 4 | 4 | 100 | 18 | 0.1 | 443 | 897 | 60 | 0 | 0 | Example |
| 5 | 5 | 100 | 21 | 0.1 | 412 | 885 | 62 | 0 | 0 | Example |
| 6 | 6 | 100 | 17 | 0.1 | 452 | 927 | 58 | 0 | 0 | Example |
| 7 | 7 | 100 | 50 | 0.2 | 408 | 826 | 57 | 0 | 0 | Example |
| 8 | 8 | 100 | 15 | 0.6 | 531 | 853 | 53 | 0 | 0 | Example |
| 9 | 9 | 95 | 40 | 0.5 | 403 | 893 | 64 | 10 | 15 | Comparative Example |
| 10 | 10 | 100 | 16 | 0.4 | 542 | 908 | 54 | 5 | 10 | Comparative Example |
| 11 | 11 | 100 | 28 | 0.5 | 397 | 832 | 60 | 0 | 0 | Comparative Example |
| 12 | 12 | 100 | 15 | 0.6 | 551 | 937 | 50 | 3 | 10 | Comparative Example |
| 13 | 13 | 90 | 27 | 0.4 | 459 | 903 | 61 | 10 | 15 | Comparative Example |
| 14 | 14 | 100 | 23 | 0.7 | 426 | 810 | 43 | 20 | 30 | Comparative Example |
| 15 | 15 | 100 | 18 | 0.6 | 444 | 874 | 57 | 3 | 10 | Comparative Example |
| 16 | 16 | 100 | 16 | 0.9 | 530 | 958 | 63 | 10 | 15 | Comparative Example |
| 17 | 17 | 100 | 20 | 0.3 | 473 | 921 | 65 | 5 | 10 | Comparative Example |
| 18 | 18 | 100 | 31 | 0.5 | 415 | 808 | 50 | 10 | 35 | Comparative Example |
| 19 | 19 | 100 | 29 | 0.4 | 448 | 927 | 61 | 10 | 20 | Comparative Example |

TABLE 3-continued

| Sample No. | Steel sample No. | Microstructure Area ratio of austenite phase (%) | Average grain size (μm) | Cleanliness of sulfide inclusion (%) | Yield strength (MPa) | Tensile strength (MPa) | Total elongation (%) | Percent brittle fracture at −196° C. (%) | Percent brittle fracture at −269° C. (%) | Remarks |
|---|---|---|---|---|---|---|---|---|---|---|
| 20 | *20* | 100 | 25 | 0.4 | 432 | 911 | 58 | 2 | *5* | Comparative Example |
| 21 | *21* | 100 | 17 | 0.5 | 476 | 920 | 59 | 5 | *10* | Comparative Example |
| 22 | *22* | 100 | 16 | 0.4 | 520 | 949 | 55 | 5 | *10* | Comparative Example |
| 23 | *23* | 100 | 19 | 0.5 | 427 | 816 | 56 | 3 | *10* | Comparative Example |
| 24 | *24* | 100 | 21 | 0.2 | 446 | 909 | 60 | 2 | *5* | Comparative Example |
| 25 | *25* | 100 | 20 | *1.0* | 461 | 825 | 54 | 5 | *20* | Comparative Example |
| 26 | *26* | 100 | 18 | *1.1* | 429 | 832 | 57 | 10 | *30* | Comparative Example |
| 27 | *27* | 100 | 23 | *1.1* | 453 | 883 | 55 | 10 | *30* | Comparative Example |
| 28 | 1 | 100 | 13 | 0.4 | 557 | 954 | 52 | 5 | *10* | Comparative Example |
| 29 | 2 | 100 | *52* | 0.5 | *390* | 875 | 57 | 0 | 0 | Comparative Example |
| 30 | 3 | 100 | 10 | 0.3 | 560 | 968 | 51 | 5 | *10* | Comparative Example |
| 31 | 4 | 100 | *51* | 0.2 | *395* | 869 | 62 | 0 | 0 | Comparative Example |
| 32 | 5 | 100 | 29 | 0.1 | 418 | 890 | 58 | 10 | *15* | Comparative Example |
| 33 | 6 | 100 | 27 | 0.1 | 426 | 881 | 54 | 10 | *15* | Comparative Example |
| 34 | *28* | 100 | 14 | 0.1 | 450 | 910 | 48 | 10 | *15* | Comparative Example |
| 35 | *29* | 100 | 17 | 0.1 | 533 | 922 | 49 | 5 | *10* | Comparative Example |
| 36 | *30* | 100 | 15 | 0.3 | 475 | 861 | 45 | 5 | *30* | Comparative Example |
| 37 | *31* | 100 | 32 | 0.1 | *397* | 885 | 63 | 0 | 0 | Comparative Example |
| 38 | 5 | 100 | *52* | 0.1 | *393* | 870 | 61 | 0 | 0 | Comparative Example |

* Underline indicates outside the scope of the present disclosure.

It has been confirmed that a steel of the present disclosure satisfies the above-mentioned target performance (yield strength of 400 MPa or more and a percent brittle fracture after Charpy impact test of less than 5%). On the other hand, in Comparative Examples that are outside the scope of the present disclosure, at least one of the yield strength and the percent brittle fracture do not satisfy the target performance described above.

The invention claimed is:
1. A steel, comprising
a chemical composition containing, in mass %,
C: 0.100% or more and 0.700% or less,
Si: 0.05% or more and 1.00% or less,
Mn: 20.0% or more and 40.0% or less,
P: 0.030% or less,
S: 0.0050% or less,
Al: 0.50% or more and 5.00% or less,
Cr: 0.5% or more and 7.0% or less,
N: 0.0050% or more and 0.0500% or less,
O: 0.0050% or less,
Ti: 0.005% or less, and
Nb: 0.005% or less, and
further containing, in mass %, at least one selected from the group consisting of
Ca: 0.0005% or more and 0.0100% or less,
Mg: 0.0005% or more and 0.0100% or less, and
REM: 0.0010% or more and 0.0200% or less,
with the balance being Fe and inevitable impurities, and
a microstructure having austenite as matrix, wherein
the microstructure has an average grain size of 50 μm or less and a cleanliness d of sulfide inclusion of less than 1.0%, the cleanliness d is calculated in accordance with provisions of JIS G 0555 (2003) and using the following formula with inclusions of Group A as sulfide inclusions:

$$d=(n/p\times f)\times 100$$

where p is a total number of grid points in a field of view, f is a number of fields of view, and n is a number of grid point centers occupied by inclusions in f fields of view, and
a yield strength is 400 MPa or more, and a percent brittle fracture after a Charpy impact test at −269° C. is less than 5%.

2. The steel according to claim 1, wherein the chemical composition further contains, in mass %, at least one selected from the group consisting of
Cu: 1.0% or less,
Ni: 1.0% or less,
Mo: 2.0% or less,
V: 2.0% or less, and
W: 2.0% or less.

* * * * *